May 18, 1965 D. O. HALE 3,184,604

HIGH-DUTY-CYCLE MULTIVIBRATOR

Filed July 31, 1961

INVENTOR.
DUANE O. HALE

BY

Roland A. Anderson

ATTORNEY.

United States Patent Office 3,184,604
Patented May 18, 1965

3,184,604
HIGH-DUTY-CYCLE MULTIVIBRATOR

Duane O. Hale, Walnut Creek, Calif., assignor to the United States of America as represented by the United States Atomic Energy Commission Filed July 31, 1961, Ser. No. 128,270
3 Claims. (Cl. 307—88.5)

The present invention relates to multivibrator circuits and more particularly to a monostable multivibrator characterized by a minimum dead time.

The monostable or one shot multivibrator is very commonly used as a delay circuit, gating circuit, or pulse shaper but has the disadvantage of a low duty cycle resulting from an inherently long recovery time. Pulse signals originated by nuclear particle detectors, for example, are frequently shaped with a monostable multivibrator to provide output pulses of uniform amplitude and duration. The incoming pulse from the particle detector triggers the multivibrator and causes a resistance-capacitance circuit therein to charge in the first half of the operating cycle and to discharge during the second half of the operating cycle. Heretofore the multivibrator has been insensitive to incoming pulses during both parts of the operating cycle. The second half of the cycle is unnecessary insofar as the pulse shaping characteristics of the multivibrator are concerned and it would be desirable to eliminate such latter half cycle since it may prevent the circuit from responding to a closely following input pulse. Thus, for greater accuracy in nuclear counting it is preferred that the dead time or nonresponsive time of the multivibrator be a minimum and this condition is also desirable in many other applications of multivibrators.

In the present invention, the second portion of the multivibrator cycle, which occurs when the resistance-capacitance network is being discharged, is largely eliminated by lowering the resistance of the path through which the capacitance element discharges to a very low value during the second portion of the cycle. Lowering the resistance permits the capacitance element to rapidly discharge and greatly reduces the length of time necessary for completion of the second portion of the operating cycle, thereby reducing the dead time of the multivibrator circuit to a minimum.

This result may be accomplished by a transistor placed in shunt with the major portion of the resistance in the discharge path of the capacitance element, such transistor being rendered conductive during the latter portion of the operating cycle and functioning as a low parallel resistance. It is necessary, however, that the full resistance be present during the first portion of the cycle for normal operation of the multivibrator.

In some instances the output of a pulse shaping circuit is received by a circuit which itself has a limited duty cycle and would be overloaded if input pulses arrived at too rapid a rate. Circuit values in the present invention may readily be adjusted to limit output pulses at rates up to, but no more than the permissible repetition rate, thus functioning to protect following circuits from overloading. With the protection provided by the present invention, an electronic system may be utilized up to full pulse rate capacity without danger of overloading since a ceiling can be placed on the pulse rate by the present invention no matter what the input pulse rate may be.

Therefore it is an object of the invention to provide a multivibrator circuit having a minimized dead time to provide more continuous sensitivity to input pulses.

It is another object of the present invention to provide an improved monostable multivibrator circuit for shaping intermittent pulses from a signal source.

It is another object of this invention to provide a multivibrator circuit having a resistance-capacitance time constant network wherein the capacitance element may be selectively discharged through a low resistance.

It is another object of the invention to provide a multivibrator circuit having means conveniently setting a selected ceiling on the output pulse rate thereof.

It is still another object of this invention to provide a monostable multivibrator circuit particularly adapted to handle closely spaced pulses which may be produced by apparatus such as a radiation detector.

The invention will be better understood by reference to the accompanying drawing of which:

Figure 1:
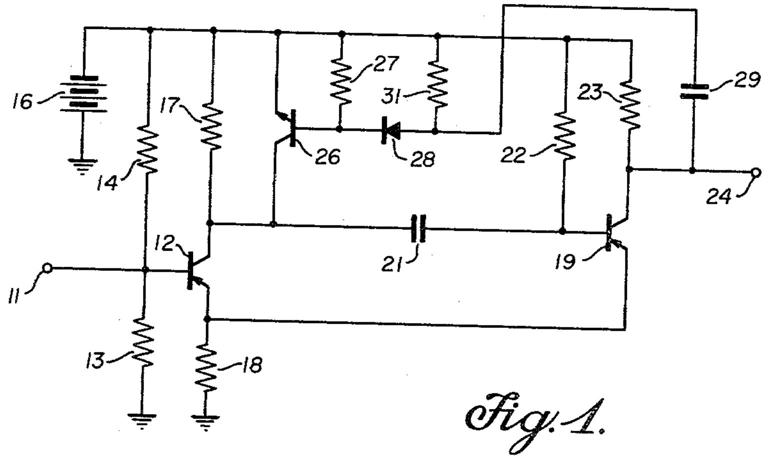
FIGURE 1 is a circuit diagram showing the invention.

Referring now to the drawing and more particularly to FIG. 1 thereof there is shown a multivibrator which includes an input terminal 11 for receiving the output of a nuclear particle counter or other source of pulses. A first PNP multivibrator transistor 12 has a base connected to the input terminal 11, the base being held at operating potential by a first base biasing resistor 13 connected from the base to ground and a second base biasing resistor 14 connected from the base to the negative terminal on a voltage source 16. The collector of the first transistor 12 is connected through a load resistor 17 to the negative terminal of the voltage source 16 while the emitter is connected through an emitter resistor 18 to ground.

A second PNP multivibrator transistor 19 has an emitter connected to the emitter of the first transistor 12, the emitter resistor 18 being used in common by both the multivibrator transistors. The base of the second transistor 19 is coupled through a charging capacitor 21 to the collector of the first transistor 12. Charging capacitor 21 and load resistor 17 together form a resistance-capacitance network which determines the time constant of the second portion of the multivibrator circuit cycle. The bias on the base of the second transistor 19 is applied through a bias resistor 22 connected from the base to the negative terminal of the voltage supply 16.

The charging capacitor 21 is charged through the bias resistor 22 and the low resistance of the first transistor 12, the capacitor 21–resistor 22 combination therefore being the principal elements which determine the time constant for the first portion of the multivibrator cycle. The collector of the second transistor 19 is connected through a load resistor 23 to the negative terminal of the voltage supply 16 and output signals developed across the resistor 23 are available at an output terminal 24 connected to the collector.

Figure 2:
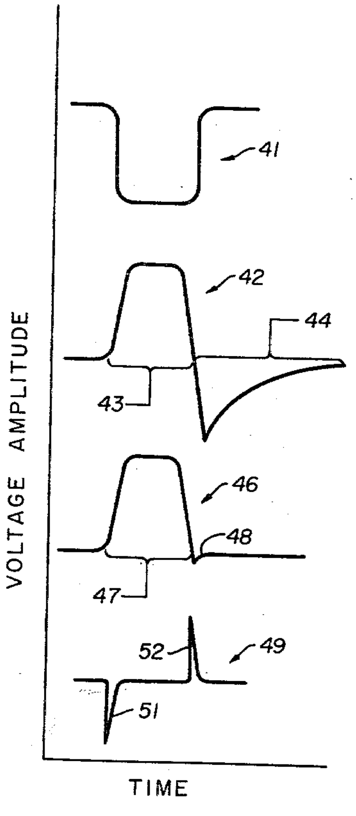
FIGURE 2 is a graphical illustration of waveforms occurring within the circuit of FIGURE 1 during operation thereof.

As described to this point the circuit may be operated as a conventional monostable multivibrator and, upon receipt of an input signal at terminal 11, will produce an output voltage having a waveform 41 as shown in FIGURE 2. In FIGURE 2 there is also shown the waveform 42 occurring at the collector of the first transistor 12. The first portion 43 of the waveform 42 is generally the only portion which is useful in a multivibrator of this class. During the latter portion 44 of the waveform 42 the multivibrator is insensitive to incoming trigger pulses and accordingly the present invention is designed to eliminate the latter portion 44 of the waveform. Elimination of such latter portion will not cause any change in the shape of the output waveform 41.

Considering now means for effecting this result and with reference again to FIGURE 1, there is shown an NPN transistor 26 having a collector connected to the collector of the first multivibrator transistor 12 and having an emitter connected to the negative voltage terminal of the voltage supply 16. The base of the NPN transistor 26 is connected through a biasing resistor 27 to the negative terminal of the voltage source 16. The cathode of a diode 28 is connected to the base of the NPN transistor 26 while the plate of the diode is connected through a coupling capacitor 29 to the output terminal 24. A biasing resistor 31 is connected from the plate of the diode 28 to the negative terminal of the voltage supply 16 so that normally both sides of the diode 28 are at the same voltage.

Considering now the operation of the circuit, assume that operating potentials are applied but that no input pulse has been received at terminal 11. The second multivibrator transistor 19 is then conductive and first transistor 12 is nonconductive as determined by a more negative bias applied to the base of the second transistor 19. The current through the common emitter resistor 18 causes a voltage drop which further biases the first multivibrator transistor 12 into a non-conductive condition. If a negative input pulse is received at the input terminal 11, the first transistor 12 starts conducting. The charging capacitor 21 couples the resultant positive pulse at the collector of the first transistor 12 to the base of the second transistor 19, causing such transistor to be biased to a non-conducting condition. The charging capacitor 21 is charged through the base bias resistor 22, the current through the resistor 22 creating a voltage drop thereacross which holds the second transistor 19 in a non-conductive condition until capacitor 21 is charged. The voltage drop across emitter resistor 18 further aids in biasing the second transistor 19 into a non-conductive state.

When the current through the bias resistor 22 decreases to some critical value as a result of a nearly full charge on the capacitor 21, the base of the second transistor 19 is at the same potential as the emitter and such transistor 19 starts to conduct, forcing first transistor 12 into a non-conductive condition through the common emitter resistor 18.

In a conventional multivibrator which lacks the shunting transistor 26, the charging capacitor 21 will discharge through the low base resistance of the second transistor 19 and through the load resistor 17. To limit the maximum transistor 12 current and to provide an adequate cutoff bias for the second transistor 19, the load resistor 17 must have a high resistance, but an excessively long time is required for the discharge of capacitor 21. Referring now again to FIGURE 2, the waveform 42 at the collector of first transistor 12 is shown as it is produced without the shunting transistor 26 in the circuit. An input signal occurring during the latter portion 44 of the waveform 42 in FIGURE 2 is lost since the circuit can not respond during this interval, however, such negative portion is essentially eliminated by the present invention as illustrated by waveform 46 so that the circuit is ready to receive input signals immediately after the desired output pulse has terminated. Thus for the purposes of the present invention the latter portion 44 of the waveform 42 is eliminated to obtain a more desirable waveform 46 having a first portion 47 identical to portion 43 of curve 42 but having a very brief second portion 48 as indicated in FIGURE 2.

With the shunting transistor 26 included in the circuit, the output waveform from the output terminal 24 is coupled through coupling capacitor 29 and through the diode 28 to the base of the transistor 26. The time constant of the resistance-capacitance network formed by a coupling capacitor 29 and resistance 31 is low so that only the rapidly changing portions of the output waveform are transmitted to the shunting transistor 26, the capacitor 29–resistance 31 acting as a differentiator to produce a differentiated waveform 49 resulting from differentiation of square wave 41. Such differentiated waveform 49 has a sharp negative pulse 51 corresponding to the leading edge of the square wave 41 and a sharp positive pulse 52 corresponding to the trailing edge of square wave 41. The values of the differentiating components capacitor 29–resistance 31 are chosen to provide a positive pulse 52 with a duration equal to that of second portion 48.

The diode 28 eliminates the negative leading portion 51 of the wave 49 of FIGURE 2. The trailing edge 52 of the wave 41 is applied to the shunting transistor 26, causing conduction therethrough and effectively short circuiting the load resistor 17. The charge of the charging capacitor 21 is very rapidly dissipated through the shunting transistor 26, providing the waveform 43. The circuit is now ready to receive another input pulse.

In an embodiment of the present invention it was found that after the termination of the output pulse the dead time lasted for a period equal to five percent of the length of the output pulse. Thus the invention is of particular value in nuclear detectors where the intermittent nature of the input signal requires as high a duty factor as possible in order that as few input pulses as possible are rejected.

As previously mentioned, the maximum repetition rate of the output pulses may be adjusted to agree with the maximum acceptance rate of following circuitry. By increasing or decreasing the time constant of the differentiation network comprised of the capacitor 29– resistance 31 the duration of the dead time of the circuit is controlled by controlling the length of portion 48 of curve 46, thereby limiting the number of output pulses to a selected maximum value.

In any one particular installation the time constant will not usually be altered after the original construction, however, if the time constant must be changed frequently, a variable resistor may be substituted for the fixed resistor 31 to facilitate such adjustment. Similarly the circuit may readily be adapted to make use of NPN type transistors rather than the PNP type herein described.

Thus it will be apparent to those skilled in the art that numerous variations and modifications may be made within the spirit and scope of the invention and it is not intended to limit the invention except as defined in the following claims.

What is claimed is:

1. A monostable multivibrator circuit, comprising, in combination, a normally non-conducting first transistor with a base adapted to receive input signals, a bias voltage supply connected to the base of said first transistor, a power supply, a discharge resistor connected from the collector of said first transistor to a first side of said power supply, a normally conducting second transistor, a capacitor connected from the base of said second transistor to the collector of said first transistor, a bias resistor connected from the base of said second transistor to the first side of said power supply, a load resistor connected from the collector of said second transistor to the first side of said power supply, an emitter resistance coupling the emitters of both of said first and said second transistors to a second side of said power supply, a normally non-conducting discharge transistor having an emitter and a collector connected across said discharge resistor, and a resistance-capacitance circuit connected from the collector of said second transistor to the base of said discharge transistor and having a time constant less than that of the circuit formed by said capacitor and load resistor.

2. A monostable multivibrator circuit as described in claim 1, further characterized by said first transistor and said second transistor being of the PNP type, said discharge transistor being of the NPN type, and the first side of said power supply being negative with respect to said second side.

3. A monostable multivibrator circuit as described in claim 1, further characterized by said first transistor and said second transistor being of the NPN type, said discharge transistor being of the PNP type, and the first end of said power supply being positive with respect to said second side.

References Cited by the Examiner

UNITED STATES PATENTS

| | | | |
|---|---|---|---|
| 2,827,574 | 3/58 | Schneider | 307—88.5 |
| 2,976,432 | 3/61 | Geckle | 307—88.5 |
| 3,040,189 | 1/62 | Cramer | 307—88.5 |
| 3,067,342 | 12/62 | Waller | 307—88.5 |
| 3,114,049 | 12/63 | Blair | 307—88.5 |

JOHN W. HUCKERT, *Primary Examiner.*